United States Patent
Ramalingam

[11] Patent Number: 6,162,863
[45] Date of Patent: Dec. 19, 2000

[54] WATERBORNE POLYURETHANES WITH UREA-URETHANE LINKAGES

[75] Inventor: Balasubramaniam Ramalingam, Cary, N.C.

[73] Assignee: Henkel Kommanditgesellschaft auf Aktien, Duesseldorf, Germany

[21] Appl. No.: 09/201,354

[22] Filed: Dec. 1, 1998

Related U.S. Application Data

[60] Provisional application No. 60/067,527, Dec. 4, 1997.

[51] Int. Cl.$^7$ ................ C08J 3/00; C08K 3/20; C08L 75/00; B65D 85/84; B05D 3/02

[52] U.S. Cl. ............ 524/591; 156/331.4; 156/331.7; 206/524.6; 427/372.2; 427/385.5; 427/388.1; 427/393.5; 428/35.2; 428/35.3; 428/35.7; 428/35.8; 428/423.1; 428/424.8; 428/425.8; 524/589; 524/590; 524/839; 524/840

[58] Field of Search ..................... 524/591, 839, 524/840, 589, 590; 156/331.4, 331.7; 206/524.6; 427/372.2, 385.5, 388.1, 393.5; 428/35.2, 35.3, 35.7, 35.8, 423.1, 424.8, 425.8

[56] References Cited

U.S. PATENT DOCUMENTS

| | | |
|---|---|---|
| 2,871,227 | 1/1959 | Walter ..................... 260/77.5 |
| 3,479,310 | 11/1969 | Dieterich et al. . |
| 3,868,350 | 2/1975 | Reiff et al. . |
| 3,926,909 | 12/1975 | Wei . |
| 3,939,126 | 2/1976 | Carder et al. . |
| 4,066,591 | 1/1978 | Scriven et al. . |
| 4,240,942 | 12/1980 | Wenzel et al. . |
| 4,387,181 | 6/1983 | Brown et al. . |
| 4,496,675 | 1/1985 | Hille et al. . |
| 4,623,416 | 11/1986 | Henning et al. . |
| 4,851,459 | 7/1989 | Ramalingam . |
| 4,883,694 | 11/1989 | Ramalingam . |
| 4,931,487 | 6/1990 | Priester, Jr. et al. . |
| 4,959,499 | 9/1990 | Harris . |
| 5,155,163 | 10/1992 | Abeywardena et al. . |

FOREIGN PATENT DOCUMENTS

| | | |
|---|---|---|
| 57-170919 | 10/1982 | Japan . |
| 59-015446 | 1/1984 | Japan . |
| 59-133248 | 7/1984 | Japan . |

OTHER PUBLICATIONS

Rosthauser et al., Waterborne Polyurethanes, *Adv. Polyurethane Sci. Tech.*, 10: 121–162 (1985).

Kirk–Othmer, Polyureas, *Encyclopedia of Chemical Technology*, vol. 13, p. 212–214 (1981).

Ritz, et al., Hydroxylamine, *Ullmann's Encyclopedia of Industrial Chemistry*, Fifth Ed., vol. A13, p.527–532, (1989).

Melvin J. Astle, Industrial Organic Nitrogen Compounds, p. 290–292 (1961).

*Primary Examiner*—Patrick D. Niland
*Attorney, Agent, or Firm*—Wayne C. Jaeschke; Stephen D. Harper

[57] ABSTRACT

Waterborne polyurethanes possessing urea-urethane linkages that are not separated by any intervening carbon atoms may be obtained by using hydroxylamine as a chain extender. Isocyanate-terminated prepolymer possessing ionized or easily ionizable groups is reacted with $NH_2OH$ to form a polyurethane possessing urea-urethane linkages corresponding to the formula:

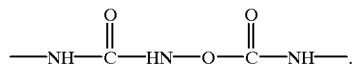

The waterborne polyurethanes are useful in adhesive, coating and ink formulations and in the flexible package industry.

39 Claims, No Drawings

WATERBORNE POLYURETHANES WITH UREA-URETHANE LINKAGES

This application claims priority to U.S. Provisional Application Ser. No. 60/067,527 filed on Dec. 4, 1997.

FIELD OF THE INVENTION

This invention relates to waterborne polyurethanes possessing urea-urethane linkages that are not separated by intervening carbon atoms, to a method of preparing the waterborne polyurethanes and to adhesive, coating and ink compositions containing the waterborne polyurethanes. The waterborne polyurethanes exhibit excellent mechanical strength and adhesion to a wide variety of substrates and can be employed in the flexible package industry.

BACKGROUND OF THE INVENTION

The commercial utility of polyurethanes in general and aqueous dispersions of polyurethanes in particular, is due substantially to the ability of the urethane groups to undergo hydrogen bonding. Besides enhancing mechanical strength, urethane groups promote adhesion to many substrates by virtue of their ability to undergo hydrogen bonding.

Processes for making waterborne polyurethanes are well established. A review of chemical syntheses of waterborne polyurethanes and of patents and relevant publications in this area can be found in *Advances in Polyurethane Science and Technology*, Technomic Publishing Co., Inc., Lancaster, Pa., USA Vol. 10, pp. 121–162, the contents of which are incorporated herein by reference. Waterborne polyurethanes are obtained by first preparing a prepolymer possessing ionized or easily ionizable groups and reactive isocyanate groups. The prepolymer is produced by reacting a polyhydroxy compound such as a polyether, polyester, polycarbonate, and the like, which possesses at least two reactive hydroxyl groups with a stoichiometric excess of an aliphatic, aromatic or cycloaliphatic polyisocyanate possessing at least two reactive isocyanate groups and an organic compound possessing at least two active hydrogens and at least one ionized or easily ionizable group. The organic compound reacts with the polyhydroxy compound and polyisocyanate compound to produce an isocyanate-terminated prepolymer containing ionized or easily ionizable groups in the prepolymer backbone. In a second step, the chain length of the prepolymer is extended by the reaction of the isocyanate end groups with di- or poly- functional agents and the resulting polyurethane is dispersed in water by neutralization or removal of the ionized or easily ionizable groups.

The chain extension reaction is a crucial step. In order to obtain polyurethane dispersions possessing useful physical properties, the polymer should have optimum molecular weight. The ability of the isocyanate groups to react rather readily with water makes the chain extension step a competing reaction. Care must be taken to control the reaction course. Reactivity of the isocyanate, the chain extending agent, hydrophilicity of the polymer back bone, concentration, temperature and mechanical conditions such as rate of mixing play an important role.

One chain extension approach involves the use of aliphatic diamines which react orders of magnitude faster than water. Examples of such amines include ethylene diamine, isophorone diamine, and the like. One problem with diamine chain extenders is that diamines exhibit very high reactivity and lead to rapid build up of molecular weight, which, in turn, deleteriously affects the dispersibility of the resulting polyurethane. Another approach involves blocking the isocyanate groups with easily cleavable functionalities like oximes and later thermally unblocking them for chain extension. Initially, a good dispersion is produced and molecular weight is increased. U.S. Pat. Nos. 4,240,942, 4,387,181 and references cited therein describe such methods. However, such deblocking reactions often undesirably produce small volatile compounds such as aldehydes or ketones. Yet another approach involves using hydrazine as chain extending agent. The resulting polyurethanes are known to exhibit better mechanical properties compared to polyurethanes produced from diamine chain extended systems. However, the carcinogenicity associated with hydrazine and its derivatives limits its use in sensitive areas. Even yet another approach involves using hydrogen peroxide as chain extender. However, the resulting polyurethanes decompose at even slightly elevated temperatures. Moreover, hydrogen peroxide can only be used in water and cannot be added directly as part of the polyol composition during prepolymer formation since hydrogen peroxide is unstable in the temperature range. Also, the reactivity of hydrogen peroxide at its two terminals is the same.

Organic hydroxylamine compounds, such as aminoethanol, the aminopropanols, the aminobutanols, the aminohexanols, the aminodecanols, methylethanolamine, the amino cyclohexanols, aminobenzyl alcohol, and the like, have been disclosed as chain extenders in polyurethane syntheses. See, e.g., U.S. Pat. Nos. 2,871,227, 3,939,126, 4,066,591 and 5,155,163. However, it is believed that inorganic hydroxylamine, i.e., $NH_2OH$, has heretofore not been employed in the synthesis of waterborne polyurethanes. The use of inorganic hydroxylamine as chain extender results in the formation of urea-urethane linking groups which are not separated by any intervening carbon atoms. In contrast, the use of organic hydroxylamine compounds such as ethanolamine results in the formation of linking groups in which the urea groups and urethane groups are separated by carbon atoms. The urea-urethane linking groups obtained by employing inorganic hydroxylamine confer special properties on the polyurethane of this invention, as will be discussed in greater detail below.

SUMMARY OF THE INVENTION

This invention relates to an aqueous polymer dispersion comprising a polyurethane containing a plurality of urea-urethane linkages corresponding to the formula:

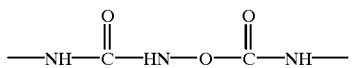

and to a process for preparing the aqueous polymer dispersion which comprises reacting an isocyanate-terminated prepolymer possessing ionized or easily ionizable groups with hydroxylamine to form a polyurethane containing a plurality of linkages corresponding to the formula:

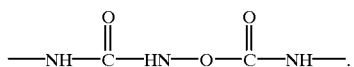

The dispersions of this invention are stable and homogeneous, and contain polyurethane resins having excellent physical, chemical and dispersion or emulsion properties.

The polyurethane dispersions obtained in accordance with the present invention are so-called self-dispersible emulsions, which do not contain an emulsifier. However, known emulsifiers may also be added to the dispersion of the present invention in order to further improve the stability of the dispersions, provided that the amount of the emulsifier used does not detrimentally affect the properties of the polyurethane polymer or the adhesive properties of the dispersion.

The present invention also discloses the use of the aqueous polyurethane dispersions, by themselves or with other reacting and/or non-reacting chemical additives, for adhesive, coating and ink applications.

The present invention further discloses new flexible packages, particularly retortable packages, comprising a plurality of flexible substrates bonded together by an adhesive comprising a polyurethane containing a plurality of linkages corresponding to the formula:

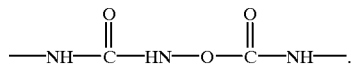

Additionally, the invention provides a method of forming flexible packages which comprises providing an adhesive comprising an aqueous dispersion of a polyurethane containing a plurality of linkages corresponding to the formula:

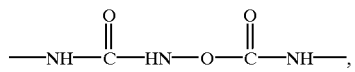

providing at least one flexible substrate, applying a layer of the adhesive to at least one selected section of the substrate and forming at least one joint between the selected section of the substrate and another section of the same or different substrate by sandwiching the adhesive therebetween.

All quantities disclosed herein, except in the examples, are to be understood as being modified by the term "about".

DESCRIPTION OF THE PREFERRED EMBODIMENTS

The chain extending agent employed in the practice of the present invention is hydroxylamine, i.e., $NH_2OH$ (CAS 7803-49-8). This compound is readily soluble in water and available as the free amine or as its acid salts. It can be liberated from the latter by treatment with ammonia or the like.

Since one end of hydroxylamine is an amino functional group, a fast reaction with isocyanates takes place. The other end of hydroxylamine is a primary hydroxyl functional group and, though it is slower reacting than the amino end, still reacts faster than water. (A relative reactivity list can be found in the Encyclopedia of Chemical Technology, Kirk-Othmer, 3rd ed., vol. 13, p. 213.) The difference in reactivity between the amino and the hydroxyl end groups of hydroxylamine allows enough time for the formation of a better dispersion which can be subsequently extended through the hydroxyl end, yet the undesirable water reaction is essentially avoided. If desired, the reaction can be performed so that only the amino end group of hydroxylamine reacts. (Industrial Organic Nitrogen Compound, Reinhold Publishing Corporation, New York. p. 290.) The hydroxyl end group can be w further reacted with a second component such as melamines, epoxies, organic titanates or zirconates.

The structural uniqueness of hydroxylamine allows extensive hydrogen bonding sites to be formed in the resulting polyurethanes. The chain lengthening process via hydroxylamine can be represented as follows:

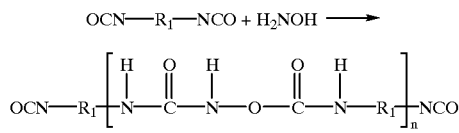

wherein $R_1$ represents the backbone of an isocyanate-terminated prepolymer, the backbone containing ionized or easily ionizable groups (not shown), and n is from 1 to about 20, preferably from 1 to about 4. It can be seen that a polyurethane is provided which possesses a plurality of urea-urethane linkages which are not separated by any intervening carbon atoms. At each one of these linkages, the potential for hydrogen bonding or positive ion association exists.

The isocyanate-terminated prepolymer is prepared by reacting an organic isocyanate compound with a polyol, or a mixture of suitable polyols, and an organic compound containing at least two active hydrogens and at least one ionized or easily ionizable group in inert organic solvent(s) that can easily solubilize the reactants at a suitable high concentration and at the required reaction temperature. Suitable solvents include 1-methyl-2-pyrrolidone, acetone, methyl ethyl ketone, and the like. The total amount of the solvent used for the synthesis is in the range of from about 0 to about 25, preferably from about 0 to 10, more preferably from about 0 to about 5 weight percent, based on the weight of the prepolymer. The amount of organic solvent used in the isocyanate-terminated prepolymer synthesis depends on the reactant concentration and the reaction temperature.

The reaction is carried out at a temperature within the range of about 20 to about 150° C., over a time period of about one half hour to about four hours, depending on the reaction temperature and the reactivity of the reactants. Preferably, the reaction temperature is in the range of about 50 to about 70° C., and the reaction time period is about 1 to about 2 hours.

The preferred organic (aromatic, aliphatic or cycloaliphatic) isocyanate compounds are polyisocyanates containing at least two isocyanate groups. Suitable diisocyanates which can be employed in this invention include aromatic, aliphatic or cycloaliphatic diisocyanates, such as 4,4'-diphenylmethane diisocyanate (MDI), 2,4- and 2,6- toluene diisocyanate (TDI), ditolyl diisocyanate (TODI), 1,5-naphthalene diisocyanate, 4,4- dibenzyl diisocyanate, m- or p-xylene diisocyanate, 1,3- phenylene diisocyanate, 1,6-hexamethylene diisocyanate, isophorone diisocyanate, 1,4-cyclohexane diisocyanate, 4,4' dicyclohexylmethylene diisocyanate, and the like.

The polyol may be any of a wide variety of oligomeric or polymeric polyols, with polyester, polyether, polycarbonate or caprolactone-based polyols containing at least two hydroxyl groups being preferred. In one embodiment of the invention, the polyols are crystalline with a crystalline melting point or melting range of from about 30° C. to about 100° C., preferably from about 40° C. to about 70° C. The polyol may have a slow or fast crystallization rate, but moderate to fast crystalline rates are preferred. Amorphous or non-crystalline polyols as well as blends of crystalline and amporphous polyols may also be utilized, however. The polyols used in this process include those that are predominantly linear having a molecular weight ranging from about 300 to about 5,000 preferably from about 1,000 to about 2,000.

Particularly preferred polymeric polyols include polyether polyols including thio ethers, polyester polyols including polyhydroxy polyesteramides and hydroxyl-containing polycaprolactones and hydroxy-containing acrylic interpolymers.

Any suitable polyether polyol can be used including those which have the following general structural formula:

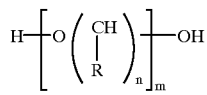

wherein the substituent R is hydrogen or lower alkyl including mixed substituents, and n is typically from 2 to 6 and m is from 2 to 100 or even higher. Included are poly(oxytetramethylene) glycols, poly(oxyethylene) glycols, polypropylene glycols and the reaction products of difunctional alcohols with propylene oxide and ethylene oxide (either as a mixture, to form substantially random copolymers, or sequentially, to form block or segmented copolymers).

Also useful are polyether polyols formed from the oxyalkylation of various polyols, for example, glycols such as ethylene glycol, 1,6-hexanediol, bisphenol A, and the like, or higher polyols, such as trimethylol propane, pentaerythiritol, and the like. Polyols of higher functionality which can be utilized as indicated can be made, for instance, by oxyalkylation of compounds such as sorbitol or sucrose. One commonly utilized oxyalkylation method is by reacting a polyol with an alkylene oxide, for example, ethylene or propylene oxide, in the presence of an acidic, or basic double metal cyanide complex catalyst.

The organic compound having at least two active hydrogens and at least one ionized or easily ionizable group is known and disclosed, e.g., in U.S. Pat. No. 4,066,591, the contents of which are incorporated by reference herein. Preferred organic compounds include diamine or diol compounds containing carboxyl groups capable of salt formation. These organic compounds contain at least two amine or two hydroxyl groups, and at least one comparatively unreactive carboxylic group at a lateral or terminal position either in the salt form or in a form capable of salt formation by neutralizing with a suitable base or a salt generating agent. Such compounds include alpha, alpha dimethylol alkanoic acids such as 2,2-dimethylol propionic acid, 2,2-dimethylol butyric acid, 2,2-dimethylol pentanoic acid and the like. A preferred alpha, alpha dimethylol alkanoic acid is 2,2-dimethylol propionic acid (DMPA).

Catalyst compounds which can be employed to facilitate the prepolymer reaction include organotin compounds or tertiary amine compounds. The reactions for forming the prepolymer may be carried out with or without catalyst. The preferred catalyst compounds for the reaction are organotin compounds, more preferably dibutyltindilaurate.

The bases used in this invention to convert the ionized or easily ionizable groups to their respective salts by neutralizing the groups, are either organic or inorganic bases. Suitable bases used in this invention are basic tertiary amine-containing organic compounds which can neutralize the carboxylic groups. Examples are N-alkyl-dialkanolamines (e.g., N-methyl diethanolamine), N-N-dialkyl alkanolamines (e.g., N-N-diethyl ethanolamine), trialkylamines (e.g., triethylamine), and the like. Triethylamine is the preferred base.

Base may be added to the prepolymer-containing reaction medium in a temperature range of from about 30 to about 90° C., more preferably, from about 40 to about 70° C. The ionic groups formed impart self-emulsifying properties to the polyurethane. The amount of the ionic or easily ionizable groups in the polymer chain is in the range of from about 10 to about 100 milli-equivalents per 100 grams of the polymer, more preferably, in the range of from about 30 to about 60 milli-equivalents per 100 grams of the polymer. Water is added to the prepolymer under vigorous stirring conditions to form a dispersion. The water temperature may be anywhere in the range of from about 20° C. to about 100° C., more preferably, water at room temperature is employed. Any solvent(s) can be removed, if desired, by distillation from the final aqueous dispersion.

For the chain extension of the prepolymer, hydroxylamine is added to the prepolymer-containing reaction medium before, during or after the step of reacting the prepolymer with base. Preferably, the dispersion and chain extension reactions are carried out simultaneously by mixing hydroxylamine and the base used for the salt formation with the water and adding these materials to the prepolymer-containing reaction medium. When the hydroxylamine level is below the stoichiometric amount required to react with the free isocyanates, foaming can be observed during the dispersion/chain extension step as a result of reactions between the free isocyanate groups and water. This can be overcome by adding a defoamer to the prepolymer-containing reaction medium before dispersion, or during or after the dispersion/chain extension process.

The polyurethane dispersion thus obtained may be diluted with water to obtain the required percent solid levels. The aqueous polyurethane dispersions obtained by the process of this invention can contain up to about 60% solids and the emulsion viscosity can range from about 10 to about 200 centipoise or higher. If necessary, the viscosity of the emulsion may be adjusted using a suitable thickener to provide a stable viscosity which will not interfere with the properties of the dispersion.

The thickener will typically be one of two types, i.e. a water-soluble gum or an associative thickener. Precise levels of the thickener in the dispersion will vary depending upon the nature and efficiency of the thickener and the viscosity desired of the dispersion, but will generally vary between 0.1% and about 10%, based on the total weight of the system to be thickened, more typically from about 0.1% to about 5%. The viscosity of the dispersions without added thickener will typically be in the range of 10 to 200 centipoise. The amount of thickener will typically be sufficient to impart to the dispersion a viscosity greater than 100 centipoise, e.g., from about 150 centipoise to about 5,000 centipoise.

Water-soluble gums are described in *Encyclopedia of Polymer Science and Engineering*, vol. 7 pp. 589–613 (John Wiley & Sons, Inc. N.Y., N.Y. 1987), the disclosure of which is incorporated by reference. These materials are high molecular weight polymers, typically polysaccharides, which are soluble in water and thicken by polymer chain entanglement. Examples of such polymers include hydroxyethylcellulose and carboxymethylcellulose. Synthetic polymers that also thicken by chain entanglement are also available. Examples include the alkali swellable acrylic polymers, e.g. copolymers of low alkyl (e.g. methyl, ethyl or butyl) acrylate esters with acrylic or methacrylic acid. These polymers typically thicken water at a neutral or alkaline pH, e.g. a pH greater than about 6.

Associative thickeners are so called because the mechanism by which they thicken may involve hydrophobic associations between the hydrophobic species in the thickener molecules and other hydrophobic surfaces, either on other thickener molecules, or on molecules in the system to be thickened. The different types of associative thickeners include, but are not limited to, hydrophobically-modified polyurethanes, hydrophobically-modified polyethers, hydrophobically-modified alkali soluble emulsions, hydrophobically modified hydroxyethyl cellulose or other products, and hydrophobically modified polyacrylamides. The molecular weight and HLB of these associative thickeners, which usually are water soluble or dispersible polymers, is chosen to be sufficiently high to impart desired rheological properties to an aqueous composition containing the thickener. Typically, the polymer has a structure such that a solution containing up to 2–3 weight percent of this polymer will exhibit a viscosity of at least 5,000, preferably at least 15,000, and most preferably at least 20,000 centipoises (as measured on a Brookfield viscometer with a number 3 spindle at 10 RPM at 25° C.).

The aqueous polyurethane dispersions obtained have particle sizes in the range of from about 10 nm to about 10 microns, preferably in the range of from about 0.05 micron to about 1 micron, and more preferably in the range of from about 0.1 micron to about 0.5 micron. The particle sizes may vary depending on the reactants and the reaction parameters. The molecular weight of the polymers generally range from about 5,000 to about 15,000 depending on the reaction parameters and the chain extension reaction. The dried polymer films often exhibit melting and/or glass transition temperatures. The melting peaks may generally occur in the range of from about 30 to about 100° C., and the glass transition temperatures fall in the range of from about -50 to about -10C.

These dispersions can be used directly, without other additives, for adhesive, coating or ink applications. Other components can be added to the polyurethane dispersions to formulate for a particular application, for example, thickeners, fillers, pigments, wetting agents, defoamers, and the like. In applications where high heat resistance and/or high humidity resistance is required, the polyurethane dispersion can be mixed with compounds that can react with the polymer to form a crosslinked (thermoset) polymer. These reactive compounds can be mixed with the dispersion before application. Reaction may occur in the polymer film during the drying process of the film or on application of heat to the polymer coating. Crosslinking of the polyurethane leads to better heat, humidity and chemical resistance.

The aqueous polyurethane dispersions of this invention are prepared without the use of emulsifiers. If desired, emulsifiers can be added to the dispersion to further stabilize the dispersion against coagulation due to the addition of external compounds to the dispersion, or against external conditions. The emulsifiers chosen should be those which do not affect the properties of the polymer.

The aqueous polyurethane dispersion can be compounded with up to about 15 weight percent, preferably from about 5 to about 15 weight percent, of commercially available melamine resins, e.g., "Cymel 301" from American Cyanamid, or epoxy resins, e.g., "Epon 828" from Shell Chemical Co. The dispersions may also be compounded with up to about 15 weight percent of vinyl-type compounds, e.g., vinyl acetate, methyl acrylate, styrene, etc., and vinyl-group containing polymers.

Typically, the aqueous polyurethane dispersions of the invention, when used as adhesives, are applied, e.g., by use of a drawdown bar, to a film, foil or other flexible substrate to provide a coating weight of about 1 to 2 pounds per 3000 square yards of substrate surface. The coated substrate is dried to remove substantially all of the water. The tacky surface is then bonded to a second same or different substrate by application of pressure to provide good contact therebetween.

The aqueous polyurethane dispersion of this invention can be advantageously employed as a binder composition in an aqueous coating composition such as a flexographic or gravure ink composition. The binder composition is prepared by dispersing a flexographic/gravure ink pigment in the polyurethane dispersion of the invention. The purpose of the pigment or colorant is to provide contrast between the color of the coated substrate and the color of the ink composition in order to provide a visually identifiable indicia on the substrate. The pigments useful in this invention will typically include white, black, organic red, organic yellow, inorganic red, inorganic yellow, and organic blue as well as violet, orange, green, brown and other hues of organic yellow and red. Useful pigments include for instance ferrite yellow oxide, red iron oxides, ferric iron oxide brown (which is a blend of red, yellow, and black iron oxides), tan oxide (which is a similar blend), raw sienna and burnt sienna, raw and burnt umber, copper phthalo cyanine green and blue, DNA orange (dinitroaniline orange #5), carbon black, lampblack, toluidine red, parachlor red, (burnt red and maroon red) hansa yellows which are azo coupling of metapara nitrotoluidiene and quinacridone red, magenta and violet.

The pigment may be any of those which are typically used in flexographic inks such as monoazo yellows (e.g. CI Pigment Yellows 3, 5, 98);

diarylide yellows (e.g. CI Pigment Yellows 12, 13, 14); Pyrazolone Orange, Permanent Red 2G, Lithol Rubine 4B, Rubine 2B, Red Lake C, Lithol Red, Permanent Red R, Phthalocyanine Green, Phthalocyanine Blue, Permanent Violet, titanium dioxide, carbon black, etc.

Opacifying pigments can be added to the polyurethane dispersion to form the binder composition of this invention. Opacifying pigments are generally pigments having a refractive index of at least about 1.8. Typical white opacifying pigments include rutile and anatase titanium dioxide.

The binder composition can further contain non-opacifying filler or extender pigments often referred to in the art as inerts and include clays, such as kaolinite clays, silica, talc, mica, barytes, calcium carbonate, and other conventional filler pigments. All filler or extender pigments have fairly low refractive indices and can be described generally as pigment other than opacifying pigment.

Metallic flake pigments are useful for the production of so-called "glamour metallic" finishes. Suitable metallic pigments include in particular aluminum flake, copper bronze flake and metal oxide coated mica.

The binder composition of this invention may contain filler/extender pigments as well as the colorant pigments to provide an aqueous dispersion having a total PVC (pigment volume content) as desired. The PVC will typically be between about 5 and about 80 weight percent.

The binder composition of this invention may be prepared as follows. The pigment is mixed with the polyurethane dispersion of the invention and, at a properly adjusted viscosity, dispersed thereinto with ball mill, sand mill, high-shear fluid flow mill, Cowles Dissolver, Katy Mill, or the like. The process of dispersing deagglomerates the pigment particles and the dispersing binder resin causes the deagglomerated particles of pigment to be wetted with the aqueous polyurethane dispersion. This wetting thus inhibits the reagglomeration of the pigment particles.

This invention also relates to printing inks comprising the binder composition of this invention and a method of preparation thereof. The method of preparation of printing inks comprises letting down the binder composition of this invention with an aqueous composition comprised of a binder resin and being essentially free of volatile organic solvents. The inks will typically be comprised of amounts of binder composition and aqueous composition that are roughly equal, i.e., the weight ratio of binder composition to aqueous composition will range from about 2:1 to about 1:2. The aqueous composition will typically be comprised of a major amount (i.e., at least 50% by weight) of water and a minor amount of resin solids (e.g., at least about 5% by weight, more typically from about 10 to about 40%, and even more typically from about 20 to about 35%). The aqueous composition will also typically be essentially free of volatile organic solvents. Thus, also provided by this invention is a printing ink comprising binder composition and aqueous composition, said ink composition being essentially free of volatile organic solvents.

In certain embodiments, the resin in the aqueous composition is a polyurethane resin identical or similar to the polyurethane resin in the binder. In other embodiments, the aqueous composition is an acrylic emulsion, e.g. a water dispersible acrylate resin prepared by the suspension polymerization of one or more monomers selected from the group consisting of alkyl acrylates, alkyl methacrylates, and mixtures of a major amount by weight of an alkyl acrylate or alkyl methacrylate with a minor amount by weight of one or more copolymerizable comonomers, in the presence of a support resin.

Thus, the printing inks of this invention may also contain, as a binder resin, an acrylate polymer. Examples of such acrylate polymers and methods for their preparation are disclosed in the U.S. Pat. No. 5,714,526, the contents of which are incorporated by reference herein.

If desired, the ink composition may contain other optional materials well known in the art of printing inks. These would include crosslinking agents, surfactants, flow control agents, thixotropic agents, fillers, anti-gassing agents, organic cosolvents, catalysts, and other customary auxiliaries. These materials can constitute up to 40 percent by weight of the total weight of the coating composition.

Coating compositions of the present invention can be applied to various substrates to which they adhere, including wood, metals, glass, cloth, plastic, foam, elastomeric substrates, and the like. The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of the coating composition to the substrate, ambient relative humidity may range from about 30 to about 80 percent. The coating composition of the present invention is particularly advantageous when applied at an ambient relative humidity ranging from about 30 to about 60 percent, yielding very smooth coatings.

A film of the coating is formed on the substrate during application of the coating composition to the substrate. Typically, the coating thickness will be about 0.1 to 5 mils (2.54 to 127 microns), preferably 0.4 to 1.5 mils (10.16 to 38.1 microns) in thickness.

The following examples illustrate the practice of the present invention:

EXAMPLE 1

In a reaction flask provided with a stirrer and heating mantle was placed 0.5 equivalents of 4,4'-dicyclohexyl methylene diisocyanate (Desmodur-W, Bayer Corporation) and 0.15 equivalents of polyoxypropyleneglycol possessing a molecular weight of 2000, (PPG 2000, Union Carbide Corp) and 8 drops of dibutyltindilaurate as catalyst. The mixture was held at 80° C. for 1 hour with good mixing. Then the temperature was brought to 80° C. and 0.25 hydroxyl equivalents of dimethylol propionic acid (DMPA) was added to the reaction medium by mixing. The temperature was maintained at 75 to 80° C. In a separate 1 liter beaker a calculated amount of deionized water and 0.1 equivalents of hydroxylamine (BASF Corp) as chain extender with 0.125 equivalents of triethyl amine as base was placed. After 5.5 hours, when the %NCO had reached a value of less than 2% (as measured by titration), the prepolymer was added to the 1 liter beaker with vigorous stirring. The resulting fine dispersion possessed a solids content of about 32%, a pH of about 7.0, and a viscosity of 150 to 200 cps at room temperature.

EXAMPLE 2

The procedure in Example 1 was repeated except 0.5 equivalents of isophorone diisocyanate (Desmodur I, Bayer Corporation) was employed. The prepolymer was dispersed as in Example 1 to yield a 40% solids dispersion, the pH of which was 7.1 and the viscosity of which was 50 to 150 cps at room temperature.

EXAMPLE 3

The procedure in Example 1 was repeated except 0.25 equivalents of isophorone diisocyanate (Desmodur I, Bayer Corporation) and 0.25 equivalents of toluene diisocyante (TDI) were used in place of Desmodur W. The prepolymer was dispersed as in Example 1 to yield a milky white 32% solids dispersion having a pH of 6.9 and viscosity of 50 to 100 cps at room temperature.

EXAMPLE 4

The procedure of Example 2 was repeated with 0.1 equivalents of polypropylene glycol of molecular weight 3000 (PPG 3025, ARCO Chemical Company) and 0.05 equivalents of hexanediol adipate (Rucoflex 105-36, Ruco Corporation) in place of PPG 2000. The resulting dispersion possessed a pH of 6.9 and a viscosity of 150 cps at room temperature.

COMPARATIVE EXAMPLE 1

In a reaction flask provided with a stirrer and heating mantle was placed 0.5 equivalents of 4,4'-dicyclohexyl methylene diisocyanate, (Desmodur-W, Bayer Corporation) and 0.15 equivalents of polyoxypropyleneglycol possessing a molecular weight of 2000 (PPG 2000, Union Carbide Corp) and 8 drops of dibutyltindilaurate as catalyst. The mixture was held at 80° C. for 1 hour with good mixing. Then the temperature was brought to 80° C. and 0.25 hydroxyl equivalents of dimethylol propionic acid (DMPA) was added to the reaction medium by mixing. The temperature was maintained at 75 to 80° C. In a separate 1 liter beaker a calculated amount of deionized water and 0.1 equivalents of ethanolamine with 0.125 equivalents of triethylamine was placed. After 5.5 hours, when the %NCO had reached a value of less than 2% (titration), the prepolymer was added to the 1 liter beaker with vigorous stirring. The resulting fine dispersion had a solids content of about 30%, a pH of about 7.2, and a viscosity of 1500 to 1700 cps at room temperature. This viscosity is too high to employ in an adhesive formulation.

EXAMPLE 5

The dispersion of Example 2 was employed to make laminations typically used in the flexible packaging industry. A 1.0 lb/ream (3000 sq. ft.) dry coating weight was applied to a primary film by a metering rod. After drying for 1 minute at 180° F. the secondary and primary film were nipped together at a temperature of 1400 and at a pressure of 50 psi on a table top laminator. Initial adhesion and 1 week adhesion of the laminates were measured on an Instron tensile tester. These data are presented in Table I below.

TABLE 1

| Primary Film | Secondary Film | Initial bond (grams/inch) | 1 week bond (grams/inch) |
|---|---|---|---|
| OPP | OPPcoex | 275 | 400 |
| MOPP | PE | 150 | 250 (50% MD) |
| OPP (PE. Elongation) | PE | 300 | 600 |

OPP = oriented polypropylene
MOPP = metallized oriented polypropylene
OPPcoex = coextruded oriented polypropylene
PE = polyethylene
MD = metal delamination It can be seen from the results of Table I that the laminates produced from the dispersion of Example 2 exhibited strong initial bonds and improved bond strength after 1 week.

EXAMPLE 6

A laminating adhesive formulation was produced from a blend of the dispersion of Example 4 and a water dispersible epoxy resin (WD 510, Shell Corporation) at a mix ratio of 100:10. The blended material was used for laminating a 48 gauge polyester film supplied by Dupont under the trade name Mylar with a polyethylene film supplied as SL1 by the same company. The dry coating weight of the adhesive was 1.5 lbs/ream. The completely cured laminate after one week was sealed into a pouch and filled with water. The water-filled pouch was boiled for 30 minutes in a beaker of water. The pouch maintained its integrity after this boiling test.

What is claimed is:

1. A composition comprising a waterborne polyurethane containing a plurality of urea-urethane linkages corresponding to the formula:

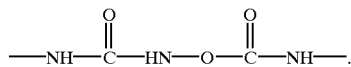

2. The composition of claim 1 further comprising at least one component selected from the group consisting of resins, thickeners, fillers, pigments, wetting agents, defoamers, emulsifiers, crosslinking agents, and mixtures thereof.

3. The composition of claim 2 wherein the resin is a melamine resin, epoxy resin or vinyl-group containing polymer.

4. The composition of claim 1 further comprising at least one pigment.

5. The composition of claim 4 further comprising at least one filler.

6. A coating composition comprising the composition of claim 4.

7. The coating composition of claim 6 further comprising at least one component selected from the group consisting of crosslinking agent, surfactant, flow control agent, thixotropic agent, filler, anti-gassing agent, organic cosolvent, catalyst and mixtures thereof.

8. An adhesive comprising the composition of claim 1.

9. The adhesive of claim 8 further comprising at least one component selected from the group consisting of resins, thickeners, fillers, pigments, wetting agents, defoamers, emulsifiers, crosslinking agents, and mixtures thereof.

10. The adhesive of claim 9 wherein the resin is a melamine resin, epoxy resin or vinyl-group containing polymer.

11. An aqueous polyurethane dispersion produced by the process which comprises the step of reacting an isocyanate-terminated prepolymer possessing ionized or easily ionizable groups with hydroxylamine to form a polyurethane containing a plurality of urea-urethane linkages corresponding to the formula:

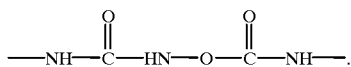

12. The aqueous polyurethane dispersion of claim 11 wherein the isocyanate-terminated prepolymer is obtained by reacting an organic isocyanate compound possessing at least two isocyanate groups with a polyol and an organic compound possessing at least two active hydrogen atoms and at least one ionized or easily ionizable group.

13. The aqueous polyurethane dispersion of claim 11 produced by the process which further comprises the step of reacting the polyurethane with a base to neutralize or remove the ionized or easily ionizable groups.

14. The aqueous polyurethane dispersion of claim 13 wherein the step of reacting the polyurethane with a base is carried out in the presence of water.

15. The aqueous polyurethane dispersion of claim 12 wherein the organic isocyanate is selected from the group consisting of 4,4'-diphenylmethane diisocyanate (MDI), 2,4- and 2,6- toluene diisocyanate (TDI), ditolyl diisocyanate (TODI), 1,5-naphthalene diisocyanate, 4,4- dibenzyl diisocyanate, m- or p-xylene diisocyanate, 1,3- phenylene diisocyanate, 1,6-hexamethylene diisocyanate, isophorone diisocyanate, 1,4-cylohexane diisocyanate, 4,4' dicyclohexylmethylene diisocyanate, and mixtures thereof.

16. The aqueous polyurethane dispersion of claim 12 wherein the polyol is selected from the group consisting of polyester polyols, polyether polyols, polycarbonate polyols, caprolactone-based polyols, and mixtures thereof.

17. The aqueous polyurethane dispersion of claim 12 wherein the organic compound is selected from the group consisting of diamine and diol compounds containing carboxyl groups capable of salt formation.

18. The aqueous polyurethane dispersion of claim 13 wherein the base is a tertiary amine.

19. A process of making a waterborne polyurethane which comprises the step of reacting an isocyanate-terminated prepolymer possessing ionized or easily ionizable groups with hydroxylamine to form a polyurethane containing a plurality of urea-urethane linkages corresponding to the formula:

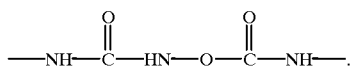

20. The process of claim 19 wherein the isocyanate-terminated prepolymer is obtained by reacting an organic isocyanate compound possessing at least two isocyanate groups with a polyol and an organic compound possessing at least two active hydrogen atoms and at least one ionized or easily ionizable group.

21. The process of claim 19 produced by the process which further comprises the step of reacting the polyurethane with a base to neutralize or remove the ionized or easily ionizable groups.

22. The process of claim 21 wherein the step of reacting the polyurethane with a base is carried out in the presence of water.

23. The process of claim 20 wherein the organic isocyanate is selected from the group consisting of 4,4'-diphenylmethane diisocyanate (MDI), 2,4- and 2,6- toluene diisocyanate (TDI), ditolyl diisocyanate (TODI), 1,5-naphthalene diisocyanate, 4,4- dibenzyl diisocyanate, m- or p-xylene diisocyanate, 1,3- phenylene diisocyanate, 1,6-hexamethylene diisocyanate, isophorone diisocyanate, 1,4-cyclohexane diisocyanate, 4,4' dicyclohexylmethylene diisocyanate, and mixtures thereof.

24. The process of claim 20 wherein the polyol is selected from the groups consisting of polyester polyols, polyether polyols, polycarbonate polyols, caprolactone-based polyols, and mixures thereof.

25. The process of claim 20 wherein the organic compound is selected from the group consisting of diamine and diol compounds containing carboxyl groups capable of salt formation.

26. The process of claim 21 wherein the base is a tertiary amine.

27. An aqueous polyurethane dispersion produced by the process which comprises:
reacting an organic isocyanate compound possessing at least two isocyanate groups with a polyol and an organic compound possessing at least two active hydrogens and at least one ionized or easily ionizable group to provide an isocyanate-terminated prepolymer;
reacting the isocyanate-terminated prepolymer with hydroxylamine to provide a polyurethane containing a plurality of urea-urethane linkages corresponding to the general formula:

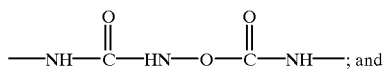; and ionized or easily ionizable group.

28. The aqueous polyurethane dispersion of claim 27 wherein the isocyanate-terminated prepolymer is reacted with hydroxylamine in the presence of water.

29. The aqueous polyurethane dispersion of claim 27 wherein the polyurethane is reacted with base in the presence of water.

30. An aqueous polyurethane dispersion produced by the process which comprises:
reacting an organic isocyanate compound possessing at least two isocyanate groups with a polyol and an organic compound possessing at least two active hydrogens and at least one ionized or easily ionizable group to provide an isocyanate-terminated prepolymer;
reacting the isocyanate-terminated prepolymer with a base to neutralize or remove the ionized or easily ionizable group; and reacting the isocyanate-terminated prepolymer with hydroxylamine to provide a polyurethane containing a plurality of urea-urethane linkages corresponding to the formula:

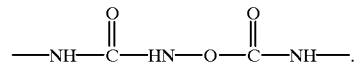

31. The aqueous polyurethane dispersion of claim 30 wherein the isocyanate-terminated prepolymer is reacted with base in the presence of water.

32. The aqueous polyurethane dispersion of claim 30 wherein the isocyanate-terminated prepolymer is reacted with hydroxylamine in the presence of water.

33. The aqueous polyurethane dispersion of claim 30 wherein the isocyanate-terminated prepolymer is simultaneously reacted with hydroxylamine and base in the presence of water.

34. A flexible package comprising a plurality of flexible substrates bonded together by an adhesive comprising a polyurethane containing a plurality of linkages corresponding to the formula:

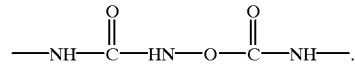

35. The flexible package of claim 34 wherein the substrates comprise non-porous film or foil.

36. The flexible package of claim 34 wherein the substrates comprise polyolefin film.

37. The flexible package of claim 36 wherein the polyolefin film is polyethylene film.

38. The flexible package of claim 34 wherein said flexible package is a retortable pouch.

39. A method of forming a flexible package which comprises providing an adhesive comprising an aqueous dispersion of a polyurethane containing a plurality of urea-urethane linkages corresponding to the general formula:

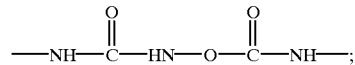

providing at least one flexible substrate;
applying a layer of the adhesive to at least one selected section of the substrate; and,
forming at least one joint between the selected section of the substrate and another section of the same or different substrate by sandwiching the adhesive therebetween.

* * * * *

UNITED STATES PATENT AND TRADEMARK OFFICE
CERTIFICATE OF CORRECTION

PATENT NO.     : 6,162,863
DATED          : December 19, 2000
INVENTOR(S)    : Ramalingam It is certified that error appears in the above-identified patent and that said Letters Patent is hereby corrected as shown below:

<u>Column 13,</u>
Line 44, before "ionized", insert -- reacting the polyurethane with a base to neutralize or remove the --.

Signed and Sealed this

Thirtieth Day of September, 2003

JAMES E. ROGAN
*Director of the United States Patent and Trademark Office*